Figure 1:
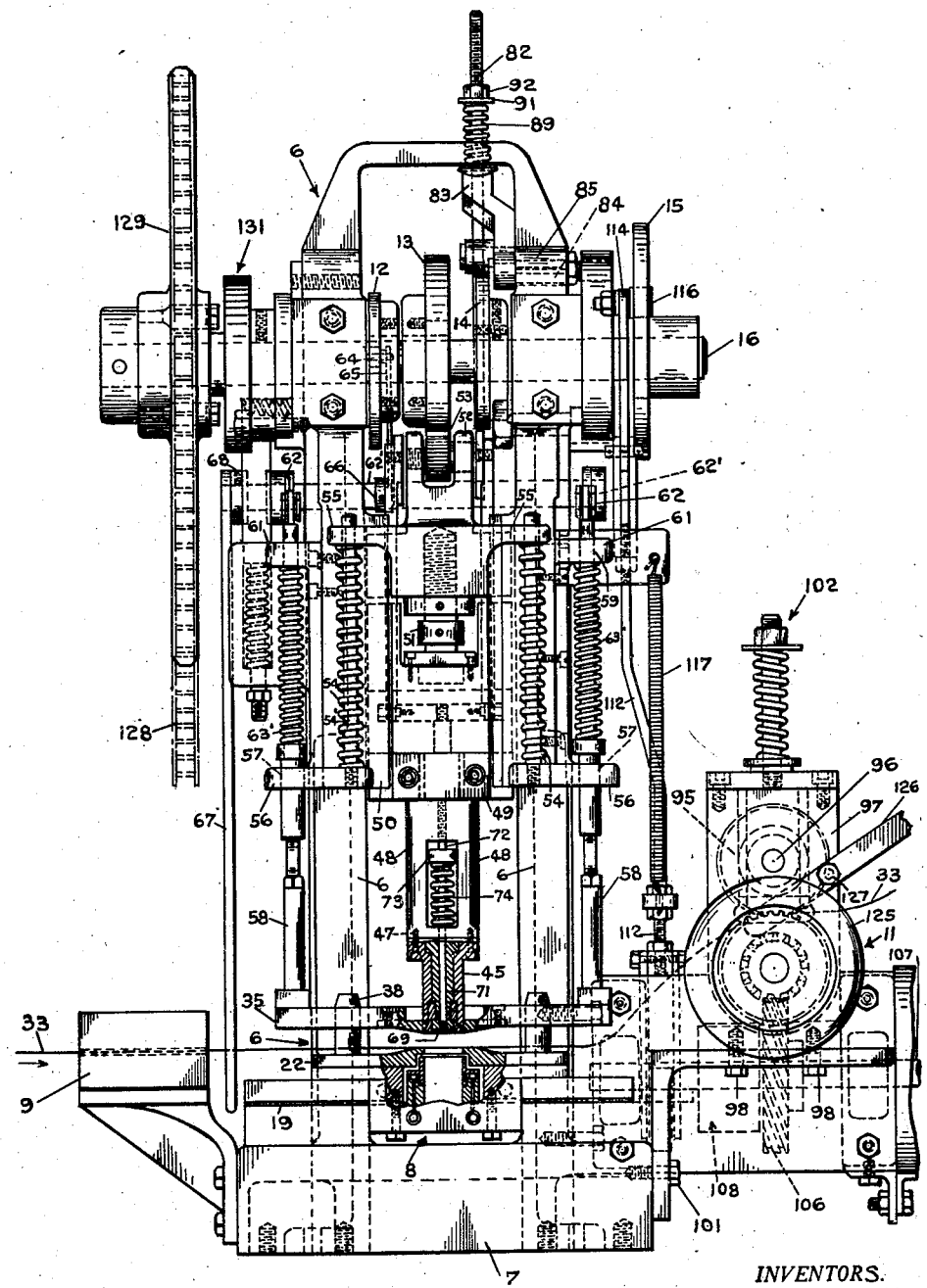

Oct. 28, 1947.  R. P. PIPEROUX ET AL  2,429,960
PRESS
Filed Sept. 20, 1944  5 Sheets-Sheet 2

INVENTORS.
R. P. PIPEROUX.
D. G. SOUSSLOFF.
BY
ATTORNEYS.

Oct. 28, 1947.　　　R. P. PIPEROUX ET AL　　　2,429,960
PRESS
Filed Sept. 20, 1944　　　5 Sheets-Sheet 4

INVENTORS.
R. P. PIPEROUX.
D. G. SOUSSLOFF.
BY
ATTORNEYS.

Oct. 28, 1947.　　　R. P. PIPEROUX ET AL　　　2,429,960
PRESS
Filed Sept. 20, 1944　　　5 Sheets-Sheet 5

INVENTORS
R.P. PIPEROUX.
D.G. SOUSSLOFF.
BY
ATTORNEYS.

Patented Oct. 28, 1947

2,429,960

UNITED STATES PATENT OFFICE 2,429,960

PRESS

Rene P. Piperoux, Radburn, N. J., and Dimitri G. Soussloff, New York, N. Y., assignors to Celanese Corporation of America, a corporation of Delaware Application September 20, 1944, Serial No. 554,888

9 Claims. (Cl. 18—19)

This invention relates to presses for shaping sheet material, and relates more particularly to automatic presses for shaping thermoplastic sheet material.

While the presses of this invention may be employed for the shaping of sheets of metal, paper or plastic sheet material, it is particularly applicable to the shaping of plastic sheet material having a basis of a thermoplastic compound such as, for example, nitrocellulose, cellulose acetate, cellulose propionate, cellulose butyrate, ethyl cellulose, benzyl cellulose, as well as ether-esters of cellulose, mixed esters of cellulose or a mixture of these, synthetic resins and polymerization products. This invention, therefore, will be described in connection with the shaping of thermoplastic sheet material.

Heretofore, the shaping of thermoplastic sheet material was effected largely by means of hand presses of the type disclosed, for example, in Patent No. 2,255,166 of Wm. E. Helmstaedter. Hand presses have been more successful in use than mechanical presses, perhaps due to the fact that the operator would "feel" the giving of the sheet stock being stretched and could regulate the speed of the advance of the forming member or ram to suit the stretch of the sheet stock up to the point of cut-off. Mechanical presses were tried and were found to be unsuitable except in certain limited applications involving shallow draws in comparison with the stroke of the press, the ram touching the sheet stock at its lower position where the velocity thereof is much reduced. The type of mechanical press usually employed for this shallow draw was of the ordinary punch-press variety consisting of a crank attached to a forming member confined in its motion sidewise between ways. The reciprocating motion of such a press, as is well known, is one of simple harmonic motion and since the rotation of the crank is uniform, equal angular displacement of the crank takes place in equal intervals of time. The motion of the forming member, however, as will be seen from a projected time-space diagram, will increase in velocity up to 90° as the crank approaches the 90° position, and will decrease again to the 180° position where it reverses. Since it is necessary for the loading of the sheet stock that there be adequate space between the die and the forming member when it is in its highest position in the press and furthermore, with any large or deep draws there be sufficient stroke left in the press to force the forming member to the end of the stroke, the arrangement of the press was such that for most applications the forming member would strike the sheet stock practically in its mid-stroke position or close to it, so that a considerable impact blow takes place on the sheet stock. This caused tears and virtually rendered deep drawing of sheet stock impossible. While this could be overcome in some measure by greatly slowing down the press so as to limit the impact to a reasonable degree, it will be appreciated that in so doing the production of the press would be greatly reduced.

It is an important object of this invention to provide an automatic or a mechanical press for deep drawing of thermoplastic sheet stock at a high rate of production without causing any tears or other faults in the products.

Another object of this invention is the provision of a press for forming or shaping thermoplastic sheet stock wherein the movements of the component parts of the press are controlled to effect mechanical or automatic deep drawing of sheet stock without the tearing of the sheet or product.

A further object of this invention is the manufacture of articles from thermoplastic sheet stock by the deep drawing operation as successfully, from the standpoint of product and quality, as has heretofore been accomplished only with hand presses.

Staill another object of this invention is the provision of a novel sheet stock feeding means.

Other objects of this invention, together with certain details of construction and combinations of parts, will appear from the following detailed description, and accompanying drawings.

Figure 2:
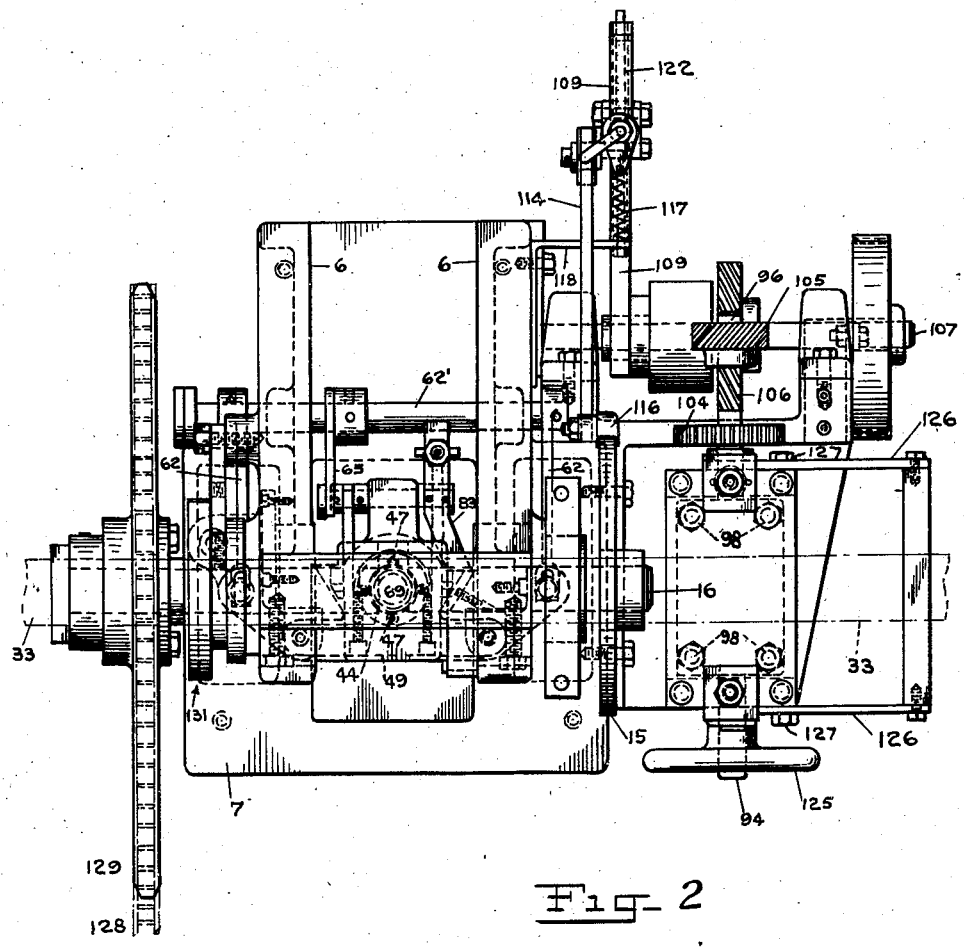
Figure 3:
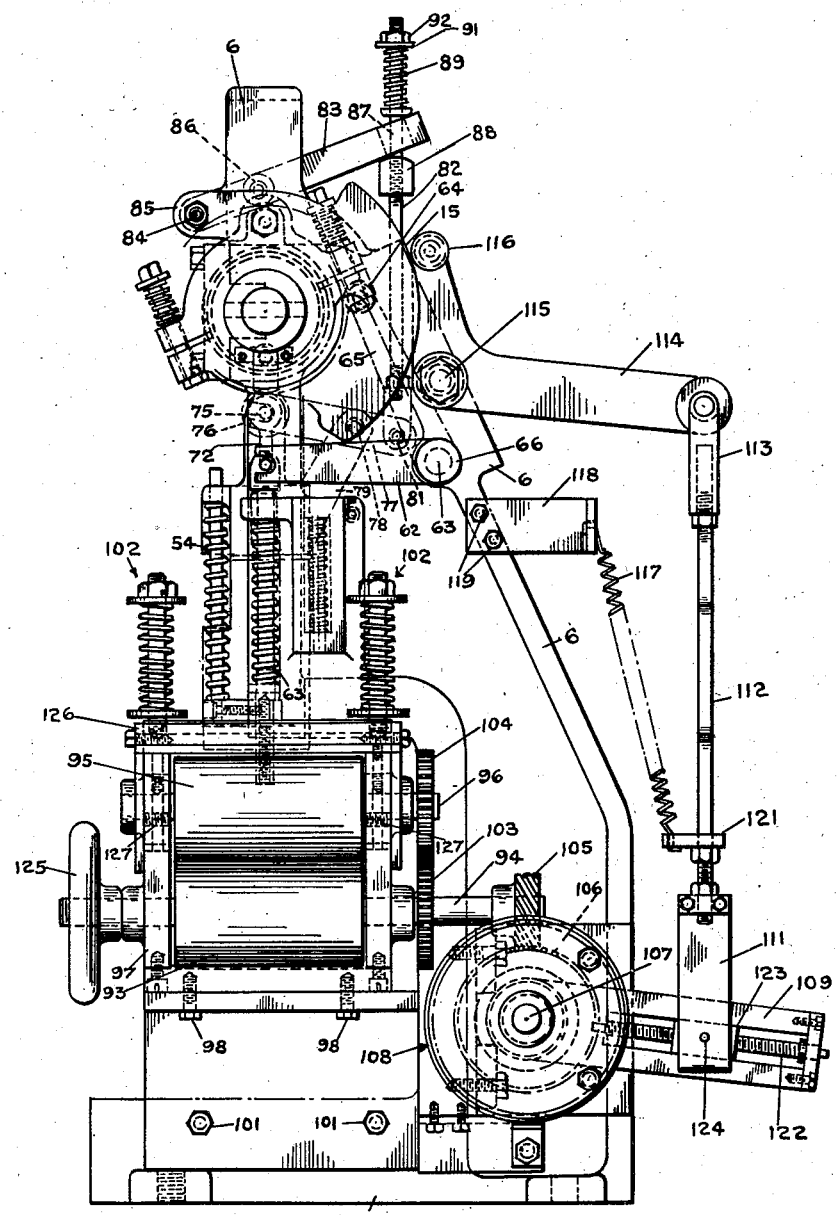
Figures 4, 5:
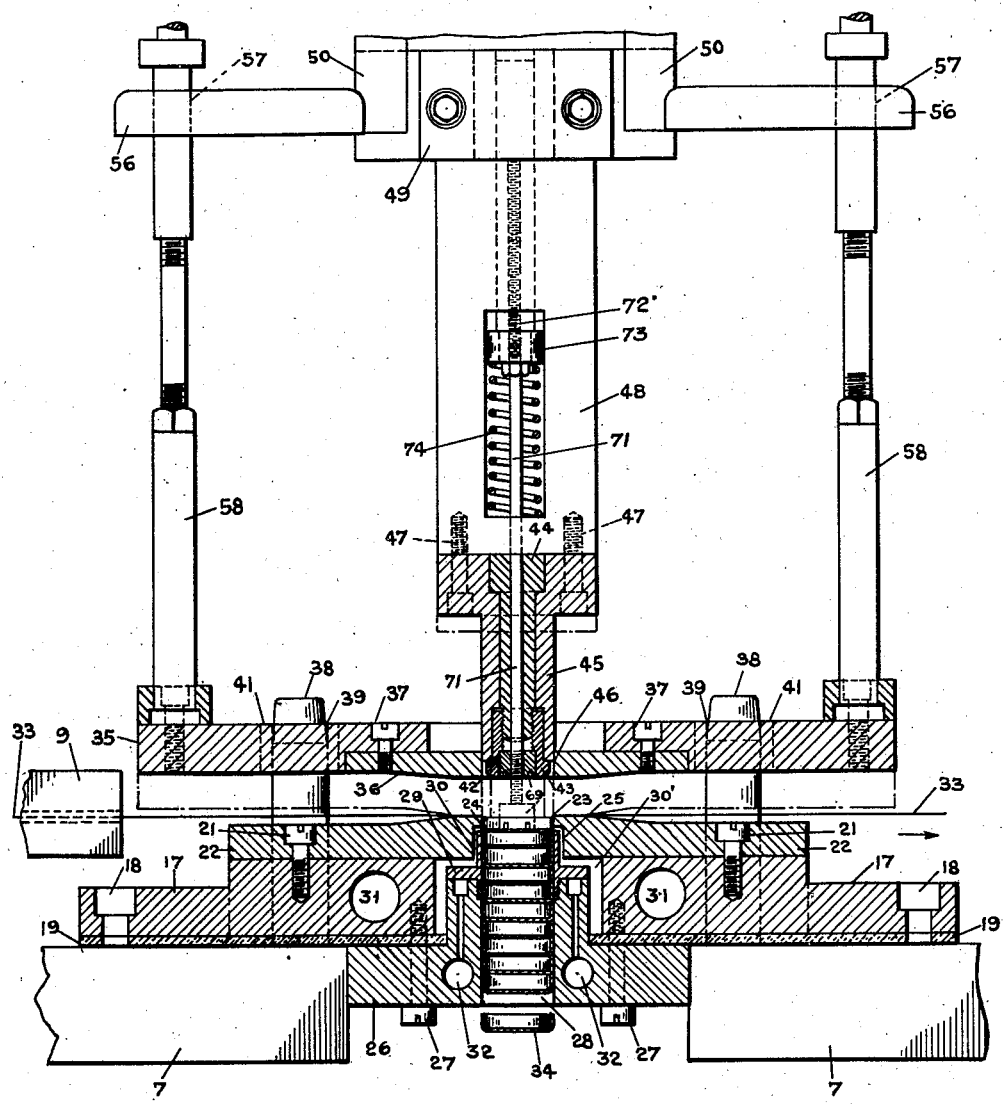
Figure 6:
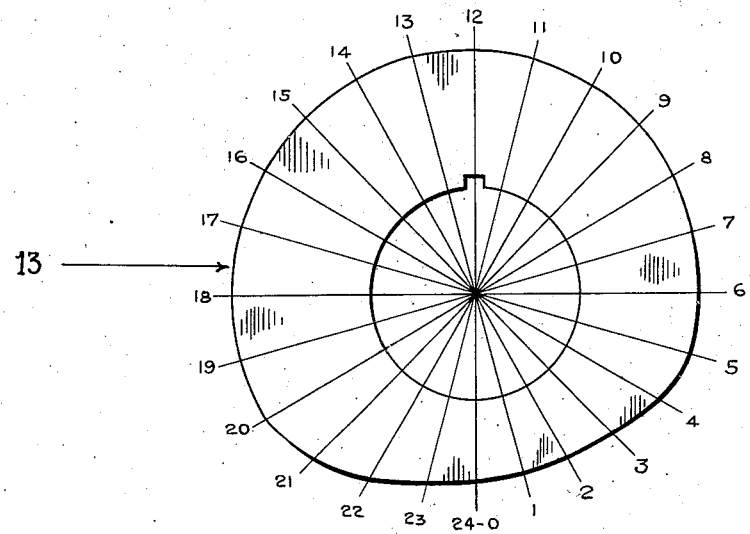
Figure 7:
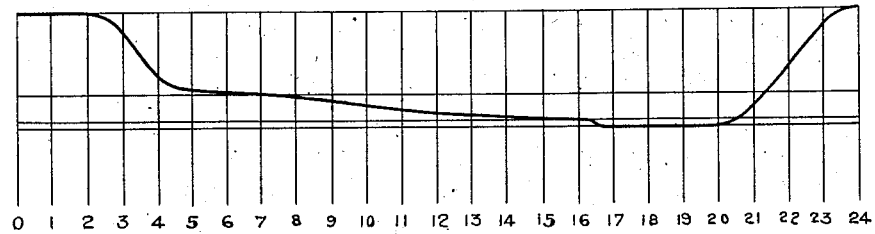
Figure 8:
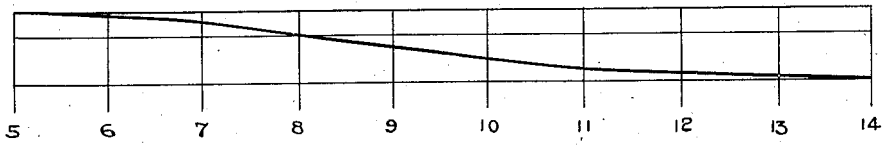

In the drawing:

Fig. 1 is a front elevational view partly in section of the press of this invention, Fig. 2 is a top plan view of the press with the cams omitted for the purpose of showing the parts beneath the same, Fig. 3, is a side elevational view of the press showing in particular the mechanism for feeding sheet stock to the shaping elements, Fig. 4 is a detailed view partly in section and on an enlarged scale, of the shaping elements of the press, Fig. 5 is a detailed view of the article formed by the press, Fig. 6 is a detailed view of the cam for operating the former, Fig. 7 is a view showing the development of the cam shown in Fig. 6, and Fig. 8 is a view showing the development of a portion of the cam shown in Fig. 6 on an enlarged scale.

Like reference numerals indicate like parts throughout the several views of the drawings.

Referring now to the drawings for a detailed description of this invention, reference numeral 6 generally indicates the frame work of the press, which frame work is carried by a base 7. The base supports the female member of the shaping die generally indicated by reference numeral 8, the sheet stock heater 9 and the feed mechanism generally indicated by reference numeral 11. The frame work 6 supports the moving elements for forming or shaping the sheet stock, and also cams 12, 13, 14 and 15, mounted on a cam shaft 16 suitably journaled in said frame work for operating said moving elements as well as the feed mechanism as will hereinafter be set forth.

On the base 7 is mounted a die holder 17 which is held therein by bolts 18 and which is insulated from base 7 by an insulating pad 19. To the die holder 17 is fixed, as by screws 21, a die member 22 having an aperture therein forming the female die 23 which is provided with a shoulder 24 formed by a cut-out portion 25 of a larger diameter than the opening forming the female die. Cooling box 26 is fixed to the underside of die holder 17 by means of screw bolts 27. This cooling box is provided with an opening 28 which registers with the female die opening to permit the passage therethrough of the formed article. The cooling box is provided with a top 29 having an integral annular flange 30 which extends into the cut-out portion 25 but which is spaced therefrom to form an insulating air space 30'. In die holder 17 is conduit 31 for the circulation of a suitable heating medium for maintaining the die member at a desired elevated temperature, and the cooling box is provided with a conduit 32 for the circulation of a suitable cooling medium for the purpose of cooling the formed article passing through the opening 28 in the cooling box.

The strip 33 of sheet stock from which articles 34 are formed pass through the heater 9 where it is softened to the desired degree by heat and then passes over the die member 22. A hold-down plate 35 having an insert 36 fixed to said plate 35 by screw bolts 37 is arranged to hold the sheet stock firmly in position during the forming operations. The hold-down plate 35 is given reciprocal movement by means hereinafter described. Posts 38 carried by the die holder 17 cooperate with openings 39 in said hold-down plate 35 for guiding said plate 35 during its reciprocating movement. Bearing members 41 may be fixed in said openings 39, if so desired.

The insert 36 is provided with a cylindrical opening 42 in which operates a cylindrical former 43, said former being threaded on to the lower end of a hollow screw 44, which screw is mounted in a hollow cut-off member 45 having an annular cutting edge 46. The cut-off member 45 is attached, as by means of screw bolts 47, to a holder 48 which is carried by a ram 49 vertically slidable in suitable ways 50 formed in the frame 6 for this purpose.

The ram 49 is made in two parts which are adjustable relative to each other by means of a screw lock nut 51. The upper part of ram 49 is provided with a bifurcated portion 52 in which is journaled a cam follower 53 cooperating with cam 13 for reciprocating the ram 49 and the holder 48 carried thereby. The ram is lowered against the action of springs 54 which return the ram to its uppermost position. The springs 54 are carried by rods 54' fixed to bosses 55 on the upper part of the ram and to brackets 56 mounted on frame 6.

The brackets 56 are provided with guide apertures 57 through which pass adjustable connecting rods 58. The lower ends of the connecting rods are attached to hold-down plate 35 and the upper ends thereof, after passing through guide apertures 59 in brackets 61 mounted on the frame 6, are passed between the bifurcated ends of arms 62, the other end of the arms being fixed to a shaft 62'. The bifurcations of arms 62 cooperate with a pin 63 for operating the connecting rods 58 and thereby the hold-down plate 35. Compression springs 63' are mounted on the connecting rods 58 between brackets 61 and 56 and the lowering action of the hold-down plate is made against the action of said springs 63'. Cam 12 operates shaft 62' and the hold-down plate 35 through the cam follower 64 and connecting rod 65 attached to shaft 62' by a collar 66. Means are also provided for operating the hold-down plate manually, said means comprising a handle 67 attached in any suitable manner, as by collar 68, to shaft 62'.

Carried in the hollow portion of former 43 for movement relative thereto is a knockout 69 threaded on to the end of a knockout pin 71 extending through a former 43, hollow screw 44 and through a portion of holder 48 in which it is fixed to a tie rod 72 carrying a relatively fixed collar 73 for containing spring 74 against the action of which knockout pin 71 operates. The rod 72 at its upper end is provided with a pin 75 which is positioned within the bifurcated end 76 of a lever 77 pivoted at 78 on a bracket 79 fixed to the frame 6. The other end of lever 77 is pivotally attached at 81 to the lower end of a rod 82 which is adapted to reciprocate to operate the knockout. The means for causing rod 82 to reciprocate comprises an arm 83 pivotally mounted on a stub shaft 84 journaled in boss 85 on frame 6. Rotatably carried on arm 83 is a cam follower 86 which cooperates with cam 14. The free end of arm 83 is provided with an opening 87 which is adapted to be threaded over rod 82. A nut 88 and a spring 89, held in position on the threaded upper end of rod 82 by means of a washer 91 and nut 92, cooperate to apply an adjustable tension on arm 83 to maintain the cam follower 86 in contact with cam 14. The rotation of the cam effects the reciprocation of the rod 82.

The sheet stock 33 is drawn intermittently through the shaping dies by the feed mechanism 11. This feed mechanism comprises lower roller 93 mounted on shaft 94 and upper roller 95 mounted on shaft 96, the shafts being journaled in suitable bearings provided therefor in a frame 97 fixed, as by bolts 98, to a platform 99 bolted to base 7 at 101. The pressure of the upper roller on the lower roller is adjusted by any suitable means such as the spring and nut arrangement generally indicated by reference numeral 102.

The rollers 93 and 95 are driven by intermeshing gears 103 and 104 mounted on shafts 94 and 96, respectively. Shaft 94 is the driven shaft and is provided with a pinion gear 105 meshing with and driven by a spiral gear 106. This latter gear is fixed to a shaft 107 which is intermittently rotated by a clutch arrangement generally indicated by reference numeral 108.

The clutch 108 is caused to rotate gear 106 as follows: An operating lever 109 is mounted on the clutch and this operating lever is joined by link 111, rod 112 and link 113 to a bell-crank lever 114 pivotally mounted at 115 on frame 6. A cam follower 116 is carried on bell-crank lever 114 for cooperation with cam 15. The cam 15, through lever 114 and rod 112, causes the lever 109 to be pushed in a downward direction, the clutch not functioning. When the cam follower 116 reaches the low spot in the cam 15 a spring 117, attached to a bracket 118 fixed to frame 6 by bolts 119, and to a link 121 fixed to rod 112, pulls lever 109 in an upward direction causing the clutch to grab and rotate gear 106 and thereby the feed rollers 93 and 95.

Means are provided to regulate or adjust the stroke of lever 109, i. e. the feed of the rollers 93 and 95, said means comprising a screw 122 carried by lever 109 on which screw is mounted a movable nut 123. Link 111 is pivotally mounted at 124 on said movable nut.

A hand wheel 125 is fixed to shaft 94 for operating the feed rollers manually. A lever 126 is pivotally mounted at 127 on frame 97 and extends between shafts 94 and 96, said lever functioning to separate the feed rollers to release the sheet stock or to facilitate the threading of the same through the feed rollers.

The drawing force for operating the press is furnished by a suitable motor (not shown) connected by means of a sprocket chain 128 to a flywheel and drive sprocket 129, the latter rotating shaft 16 and the cams thereon through a clutch arrangement generally indicated by reference numeral 131.

The operation of the press of this invention is as follows: The sheet stock 33 from a master spool (not shown) is threaded through the heater 9, then is passed between the die member 22 and the hold-down plate 35 and finally threaded between rollers 93 and 95 of the feeding device. Rotation of rollers 93 and 95, either manually by hand wheel 125 or mechanically through the operation of operating lever 109 and its accompanying linkage, will advance the sheet stock between the die element, in the former case to any desired degree and in the latter case to any degree predetermined by the location of the pivot 124 on the screw 122. The pivot 124 is adjusted along screw 122 for each job, i. e. for each new article to be formed, in order to give an advance per stroke just equal to the amount of sheet stock used in the formation of the article being molded.

After the sheet stock has been threaded through the press, the rotation of cam shaft 16 will first bring down the hold-down plate 35 by means of cam 12 and through shaft 62, cam follower 64 and its accompanying linkage. Further rotation of shaft 16 causes cam 13 to act on cam follower 53 thus lowering the ram 49 and its accompanying parts. Since the ram carries former 43 it causes the latter to draw the sheet stock into the aperture of die member 22 to a depth predetermined by the contour of the cam 13, thus forming the article. Cam 13 is so shaped as to impart a motion to the ram comprising a uniformly accelerated motion at the start, and then a uniformly decelerated motion to a point where the former 43 just touches the sheet stock so that at this instant the velocity of the ram and therefore the former is zero, and the stock receives no impact.

Due to the design of cam 13, further rotation thereof will again accelerate the former, causing it to attain uniform velocity and then decelerate the same so that when the sheet stock has been drawn down to the desired depth and the article formed, the ram is again at a momentary standstill. Again determined by the design of the cam 13, there is another slight advance of the ram causing the cut-off of the sheet stock by pinching the sheet stock between the cut-off edges 23 and 46. At this point cam 13 becomes inactive and cam 14 operates through arm 83, rod 82, pin 75, etc., to force the collar 73, pin 71 and knock-out 69 in a downward direction to eject the finished article to the cooling box 26. Further rotation of shaft 16 will return all parts, that is, the knock-out 69, the former 43, the hold-down plate 36, etc., to their initial position, at which point, while there is a slight dwell, cam 15 through the medium of arms 114, 112, pivot 124, etc. will operate to move the feed mechanism described above and act to bring new, unused sheet stock between the dies for a repetition of the operation.

Shaft 16 rotates continuously and all the intermittent motions described above are due to the contours of cams 12, 13, 14 and 15. Where the contour of the cams is concentric with the shaft there will, of course, be no motion of the cam followers or the parts connected thereto.

Referring more specifically to Figs. 6, 7 and 8, Fig. 6 shows in greater detail the contour of cam 13, and Fig. 7 shows the development of said cam 13, the numerals 0 to 24 in Fig. 7 corresponding to the positions indicated by said numerals 0 to 24 along the periphery of cam 13 shown in Fig. 6. Fig. 8 shows on an enlarged scale the development of the portion of the cam 13 between positions 5 and 14 in Fig. 6.

The operation described above is for the forming of a simple article, such as a box. It will be understood, however, that the motion of any one or all of the cams can be altered in relation with each other so as to produce unlimited combinations, the present device being designed so that the cams can be easily interchanged at a minimum expense of time and labor.

It is to be understood that the foregoing detailed description is merely given by way of illustration and that many variations may be made therein without departing from the spirit of our invention.

Having described our invention, what we desire to secure by Letters Patent is:

1. In a press for shaping sheet material, the combination with a movable former, of a support for the sheet material, means including a cam and a cam follower for effecting movement of said former, a shaft on which said cam is mounted, and means for rotating said shaft, said cam having a portion which increases radially for imparting movement of said former toward said support, followed by a portion of constant radius which is in contact with said cam follower at the moment that said former in its movement touches the sheet material, thus effecting a temporary halt in the movement of said former and avoiding any substantial impact of said former on the sheet material, the latter portion being followed by a portion of gradually increasing radius for imparting to said former a slow advancing movement during the shaping operation.

2. In a press for shaping sheet material, the combination with a movable former, of a support for the sheet material, means including a cam and a cam follower for effecting movement of said former, a shaft on which said cam is mounted, and means for rotating said shaft, said cam having a portion which is of constant radius which when in contact with said cam follower the former is at the beginning of its stroke, followed by a portion which increases radially for imparting movement of said former toward said support, followed by a portion of constant radius which is in contact with said cam follower at the moment that said former in its movement touches the sheet material, thus effecting a temporary halt in the movement of said former and avoiding any substantial impact of said former on the sheet material, followed by a portion of gradually increasing radius for imparting to said former a slow advancing movement during the shaping operation, followed by another portion of constant radius for effecting a stop of said former at the end of its stroke, the latter portion of constant radius being followed by a portion of decreasing radius whereby said former is permitted to be rapidly moved to the beginning of its stroke.

3. In a press for shaping sheet material, the combination with a movable former, of a support for the sheet material, means including a cam and a cam follower for effecting movement of said former, a shaft on which said cam is mounted, and means for rotating said shaft, said cam having a portion which is of constant radius which when in contact with said cam follower the former is at the beginning of its stroke, followed by a portion which increases radially for imparting movement of said former toward said support, followed by a portion of constant radius which is in contact with said cam follower at the moment that said former in its movement touches the sheet material, thus effecting a temporary halt in the movement of said former and avoiding any substantial impact of said former on the sheet material, followed by a portion of gradually increasing radius for imparting to said former a slow advancing movement during the shaping operation, followed by another portion of constant radius for effecting a stop of said former at the end of its stroke, the latter portion of constant radius being followed by a portion of decreasing radius whereby said former is permitted to be rapidly moved to the beginning of its stroke and spring means for moving said former to the beginning of its stroke.

4. In a press for shaping sheet material, the combination with a movable former, of a support for the sheet material, means including a cam and a cam follower for effecting movement of said former, a shaft on which said cam is mounted, and means for rotating said shaft, said cam having a portion which increases radially for imparting movement of said former toward said support, followed by a portion of constant radius which is in contact with said cam follower at the moment that said former in its movement touches the sheet material, thus effecting a temporary halt in the movement of said former and avoiding any substantial impact of said former on the sheet material, the latter portion being followed by a portion of gradually increasing radius for imparting to said former a slow advancing movement during the shaping operation, means for intermittently feeding the sheet material to said support, and means for holding the sheet material on said support during the shaping operation.

5. In a press for shaping sheet material, the combination with a movable former, of a support for the sheet material, means including a cam and a cam follower for effecting movement of said former, a shaft on which said cam is mounted, and means for rotating said shaft, said cam having a portion which increases radially for imparting movement of said former toward said support, followed by a portion of constant radius which is in contact with said cam follower at the moment that said former in its movement touches the sheet material, thus effecting a temporary halt in the movement of said former and avoiding any substantial impact of said former on the sheet material, the latter portion being followed by a portion of gradually increasing radius for imparting to said former a slow advancing movement during the shaping operation, means, including a pair of cooperating rollers, a gear on each roller cooperating with each other for rotating said rollers, a gear arrangement for operating said first-mentioned gears, a clutch operatively connected to said gear arrangement, a rotatable cam, levers operatively joining said cam and said clutch and means on one of said levers for adjusting the stroke of said clutch, said latter cam being mounted on the same shaft as said first-mentioned cam, for intermittently feeding the sheet material to said former, and means for holding the sheet material on the support during the shaping operation.

6. In a press for shaping sheet material, the combination with a movable former, of a support for the sheet material, means including a cam and a cam follower for effecting movement of said former, a shaft on which said cam is mounted, and means for rotating said shaft, said cam having a portion which is of constant radius which when in contact with said cam follower the former is at the beginning of its stroke, followed by a portion which increases radially for imparting movement of said former toward said support, followed by a portion of constant radius which is in contact with said cam follower at the moment that said former in its movement touches the sheet material, thus effecting a temporary halt in the movement of said former and avoiding any substantial impact of said former on the sheet material, followed by a portion of gradually increasing radius for imparting to said former a slow advancing movement during the shaping operation, followed by another portion of constant radius for effecting a stop of said former at the end of its stroke, the latter portion of constant radius being followed by a portion of decreasing radius whereby said former is permitted to be rapidly moved to the beginning of its stroke, means for intermittently feeding the sheet material to said support, and means for holding the sheet material on said support during the shaping operation.

7. In a press for shaping sheet material, the combination with a movable former, of a support for the sheet material, means including a cam and a cam follower for effecting movement of said former, a shaft on which said cam is mounted, and means for rotating said shaft, said cam having a portion which is of constant radius which when in contact with said cam follower the former is at the beginning of its stroke, followed by a portion which increases radially for imparting movement of said former toward said support, followed by a portion of constant radius which is in contact with said cam follower at the moment that said former in its movement touches the sheet material, thus effecting a temporary halt in the movement of said former and avoiding any substantial impact of said former on the sheet material, followed by a portion of gradually increasing radius for imparting to said former a slow advancing movement during the shaping operation, followed by another portion of constant radius for effecting a stop of said former at the end of its stroke, the latter portion of constant radius being followed by a portion of decreasing radius whereby said former is permitted to be rapidly moved to the beginning of its stroke, means, including a pair of cooperating rollers, a gear on each roller cooperating with each other for rotating said rollers, a gear arrangement for operating said first-mentioned gears, a clutch operatively connected to said gear arrangement, a rotatable cam, levers operatively joining said cam and said clutch and means on one of said levers for adjusting the stroke of said clutch, said latter cam being mounted on the same shaft as said first mentioned cam, for intermittently feeding the sheet material to said former, and means for holding the sheet material on the support during the shaping operation.

8. In a press for shaping sheet material, the combination with a movable former, of a support for the sheet material, means including a cam and a cam follower for effecting movement of said former, a shaft on which said cam is mounted, and means for rotating said shaft, said cam having a portion which is of constant radius which when in contact with said cam follower the former is at the beginning of its stroke, followed by a portion which increases radially for imparting movement of said former toward said support, followed by a portion of constant radius which is in contact with said cam follower at the moment that said former in its movement touches the sheet material, thus effecting a temporary halt in the movement of said former and avoiding any substantial impact of said former on the sheet material, followed by a portion of gradually increasing radius for imparting to said former a slow advancing movement during the shaping operation, followed by another portion of constant radius for effecting a stop of said former at the end of its stroke, the latter portion of constant radius being followed by a portion of decreasing radius whereby said former is permitted to be rapidly moved to the beginning of its stroke, spring means for moving said former to the beginning of its stroke, means for intermittently feeding the sheet material to said support, and means for holding the sheet material on said support during the shaping operation.

9. In a press for shaping sheet material, the combination with a movable former, of a support for the sheet material, means including a cam and a cam follower for effecting movement of said former, a shaft on which said cam is mounted, and means for rotating said shaft, said cam having a portion which is of constant radius which when in contact with said cam follower the former is at the beginning of its stroke, followed by a portion which increase radially for imparting movement of said former toward said support, followed by a portion of constant radius which is in contact with said cam follower at the moment that said former in its movement touches the sheet material, thus effecting a temporary halt in the movement of said former and avoiding any substantial impact of said former on the sheet material, followed by a portion of gradually increasing radius for imparting to said former a slow advancing movement during the shaping operation, followed by another portion of constant radius for effecting a stop of said former at the end of its stroke, the latter portion of constant radius being followed by a portion of decreasing radius whereby said former is permitted to be rapidly moved to the beginning of its stroke, spring means for moving said former to the beginning of its stroke, means, including a pair of cooperating rollers, a gear on each roller cooperating with each other for rotating said rollers, a gear arrangement for operating said first-mentioned gears, a clutch operatively connected to said gear arrangement, a rotatable cam, levers operatively joining said cam and said clutch and means on one of said levers for adjusting the stroke of said clutch, said latter cam being mounted on the same shaft as said first-mentioned cam, for intermittently feeding the sheet material to said former, and means for holding the sheet material on the support during the shaping operation.

RENE P. PIPEROUX.
DIMITRI G. SOUSSLOFF.

REFERENCES CITED

The following references are of record in the file of this patent:

UNITED STATES PATENTS

| Number | Name | Date |
|---|---|---|
| 1,253,316 | Weiland | Jan. 15, 1918 |
| 1,273,009 | Simmons | July 16, 1918 |
| 1,880,858 | Davis | Oct. 4, 1932 |
| 1,904,268 | Bronson | Apr. 18, 1933 |
| 2,255,116 | Helmstaedter | Sept. 9, 1941 |
| 924,555 | Jenkins | June 8, 1909 |
| 2,346,212 | Flowers | Apr. 11, 1944 |
| 2,347,272 | Longfield | Apr. 25, 1944 |